United States Patent
Jung et al.

(10) Patent No.: US 9,748,795 B2
(45) Date of Patent: Aug. 29, 2017

(54) SYSTEM FOR CHARGING A RECHARGEABLE BATTERY OF AN ELECTRIC VEHICLE

(71) Applicant: Bayerische Motoren Werke Aktiengesellschaft, Munich (DE)

(72) Inventors: Merten Jung, Munich (DE); Patrick Mueller, Wolnzach-Gosseltshausen (DE); Robert Griessbach, Weyarn (DE); Thomas Schimanek, Seefeld (DE); Christian Hieber, Germering (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 603 days.

(21) Appl. No.: 13/781,973

(22) Filed: Mar. 1, 2013

(65) Prior Publication Data
US 2013/0175990 A1    Jul. 11, 2013

Related U.S. Application Data

(63) Continuation of application No. PCT/EP2011/064547, filed on Aug. 24, 2011.

(30) Foreign Application Priority Data

Sep. 3, 2010  (DE) .......................... 10 2010 040 239

(51) Int. Cl.
*B60L 11/18*    (2006.01)
*B60L 11/08*    (2006.01)
(Continued)

(52) U.S. Cl.
CPC ............... *H02J 7/14* (2013.01); *B60L 11/126* (2013.01); *B60L 11/185* (2013.01);
(Continued)

(58) Field of Classification Search
CPC .......................................................... H02J 7/14
(Continued)

(56) References Cited

U.S. PATENT DOCUMENTS 4,010,381 A * 3/1977 Fickenscher et al. .......... 307/66
5,545,046 A * 8/1996 Masuda et al. ............... 439/142
(Continued)

FOREIGN PATENT DOCUMENTS

DE    10 2009 044 211 A1    4/2010
DE    20 2010 000 551 U1    4/2010
(Continued)

OTHER PUBLICATIONS

Colak, Modular Power Converter for Lead Acid Battery Charging, 2008 IEEE.*

(Continued)

*Primary Examiner* — Samuel Berhanu
*Assistant Examiner* — Tarikh Rankine
(74) *Attorney, Agent, or Firm* — Crowell & Moring LLP

(57) ABSTRACT

An electric vehicle includes an electric machine, a generator generating a first AC output current, an internal combustion engine driving the generator, and a first electric plug-in charging device. When the engine is started, the generator supplies the battery with charging power. The first plug-in charging device is geometrically configured to be connectable with single phase AC power mains to supply the battery with charging power in a vehicle deactivated state. The first plug-in charging device is configured for a maximum electric power voltage load of 240 volts and a maximum current strength of 32 amperes. A second electric plug-in charging device is integrated into the vehicle. A DC charging station is connectable to the second charging device in the deactivated state so the DC charging station is usable either (Continued)

exclusively or simultaneously with the single phase AC power mains for charging the battery.

19 Claims, 1 Drawing Sheet

(51) Int. Cl.
*B60L 11/10* (2006.01)
*H02J 7/00* (2006.01)
*H02J 7/14* (2006.01)
*H02J 7/34* (2006.01)
*B60L 11/12* (2006.01)
*H02J 7/02* (2016.01)

(52) U.S. Cl.
CPC ......... *B60L 11/1816* (2013.01); *H02J 7/0055* (2013.01); *H02J 7/02* (2013.01); *B60L 11/1818* (2013.01); *B60L 2210/30* (2013.01); *B60L 2210/40* (2013.01); *Y02T 10/6217* (2013.01); *Y02T 10/7005* (2013.01); *Y02T 10/7072* (2013.01); *Y02T 10/7077* (2013.01); *Y02T 10/7241* (2013.01); *Y02T 90/121* (2013.01); *Y02T 90/127* (2013.01); *Y02T 90/128* (2013.01); *Y02T 90/14* (2013.01)

(58) Field of Classification Search
USPC ........................................................ 320/109
See application file for complete search history.

(56) References Cited

U.S. PATENT DOCUMENTS

| | | | |
|---|---|---|---|
| 5,642,270 A | 6/1997 | Green et al. | |
| 5,698,905 A * | 12/1997 | Ruthlein et al. | 290/32 |
| 5,736,831 A * | 4/1998 | Harrington | 320/104 |
| 8,120,290 B2 | 2/2012 | King | |
| 2003/0230443 A1 * | 12/2003 | Cramer et al. | 180/65.5 |
| 2004/0000815 A1 * | 1/2004 | Pereira | 307/11 |
| 2006/0152189 A1 | 7/2006 | Ambrosio et al. | |
| 2007/0068714 A1 * | 3/2007 | Bender | B60K 6/28 180/65.29 |
| 2007/0278020 A1 * | 12/2007 | Harris et al. | 178/18.01 |
| 2008/0094013 A1 * | 4/2008 | Su | B60L 11/1811 318/139 |
| 2008/0100259 A1 | 5/2008 | Tabatowski-Bush | |
| 2008/0143292 A1 | 6/2008 | Ward | |
| 2009/0296442 A1 * | 12/2009 | Chang | H02J 7/0054 363/142 |
| 2010/0206100 A1 * | 8/2010 | Vyas et al. | 74/15.63 |
| 2011/0050174 A1 * | 3/2011 | King | B60L 11/1811 320/134 |
| 2011/0148353 A1 * | 6/2011 | King | B60L 7/12 320/109 |
| 2011/0204845 A1 * | 8/2011 | Paparo et al. | 320/108 |

FOREIGN PATENT DOCUMENTS

| | | |
|---|---|---|
| EP | 0 596 988 A1 | 5/1994 |
| EP | 0 610 258 B1 | 3/1997 |
| EP | 2 039 560 A1 | 3/2009 |
| EP | 2 113 410 A1 | 11/2009 |
| FR | 2 942 087 A1 | 8/2010 |
| WO | WO 93/02887 A1 | 2/1993 |

OTHER PUBLICATIONS

International Preliminary Report on Patentability (PCT/IB/338 & PCT/IB/373), including Written Opinion (PCT/ISA/237) dated Mar. 14, 2013 (seven (7) pages.
International Search Report including English translation dated Mar. 27, 2012 (Six (6) pages).
German Search Report including partial English language translation dated Jul. 15, 2011 (Ten (10) pages).

\* cited by examiner

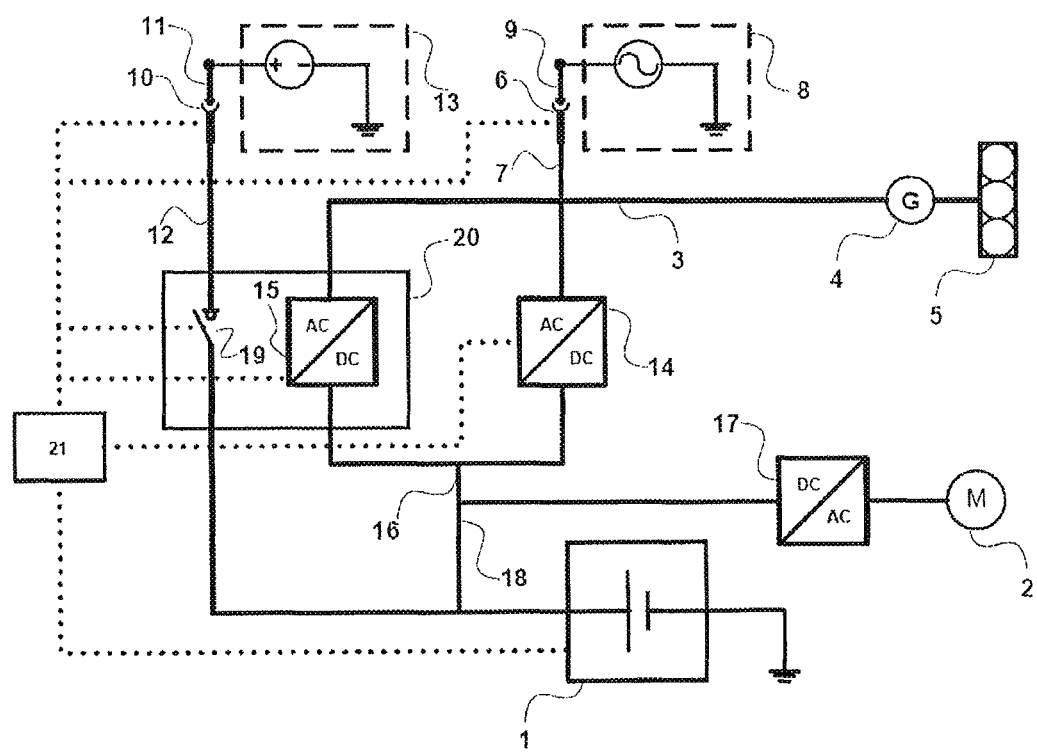

SYSTEM FOR CHARGING A RECHARGEABLE BATTERY OF AN ELECTRIC VEHICLE

CROSS REFERENCE TO RELATED APPLICATIONS

This application is a continuation of PCT International Application No. PCT/EP2011/064547, filed Aug. 24, 2011, which claims priority under 35 U.S.C. §119 from German Patent Application No. DE 10 2010 040 239.7, filed Sep. 3, 2010, the entire disclosures of which are herein expressly incorporated by reference.

BACKGROUND AND SUMMARY OF THE INVENTION

The invention relates to a system that is configured for charging a rechargeable battery of an electric vehicle, which electric vehicle is provided with an electric machine, a generator that generates a first AC output current, an internal combustion engine that drives the generator and that can be started during the driving mode of the electric vehicle, and a first electric plug-in charging device.

In particular, climate and environmentally friendly vehicle concepts with alternative drive variants, in particular, electric drives, are gaining more and more market share in the area of motorized private transportation of passengers. These electric drives typically draw the electric power for the drive from batteries having a voltage state in the high voltage range, preferably rechargeable batteries based on lithium ion technology. These secondary batteries offer some advantages with respect to the energy and power density, as compared to other electrochemical energy accumulator technologies. In vehicles with an electric drive, these accumulators are usually charged in a stationary mode or in a deactivated state of the electric vehicle, i.e. in an operating state in which the vehicle is not ready to drive. The charging is typically performed by way of the AC power mains, as a rule the house power mains of the vehicle user, or by way of DC charging stations.

In the case of electric vehicles with an internal combustion engine that can be switched on during the driving mode, it is also possible to charge while the vehicle is travelling, or more specifically, in an operating state, in which the vehicle is ready to drive. The internal combustion engine drives a generator for generating current that can also be used as the battery charging current. Preferably, the power delivered by the internal combustion engine is used to extend the range of an electric drive machine of the electric vehicle, for which reason the combination of internal combustion engine and generator is referred to as the "range extender" in the present document. Consequently, the architecture of the automotive electrical system of an electric vehicle has to meet special technical requirements that relate predominantly to the energy and power flows in the stationary mode and in the driving mode of the electric vehicle. The system for charging the rechargeable battery represents a part of this automotive electrical system architecture.

Charging systems for recharging the battery of an electric vehicle are known from the prior art. For example, EP 0 596 988 M1 describes an electrical supply system of a battery-powered electric vehicle. In this case the supply from public utility AC power grids is assumed.

Furthermore, EP 0 610 258 B1 describes a charging station for electric vehicles and stresses at the outset the condition that the charging station provides a direct voltage.

The object of the present invention is to provide an improved charging system for recharging a battery in an electric vehicle.

This and other objects are achieved by a system for charging a rechargeable battery of an electric vehicle in which the electric vehicle is provided with an electric machine, a generator that generates a first AC output current, an internal combustion engine that drives the generator and that can be started during the driving mode of the electric vehicle, and a first electric plug-in charging device. When the internal combustion engine is started, the generator can be used at least temporarily as an electric power source for supplying the battery with charging power; and the first plug-in charging device is geometrically configured in such a way that a single phase AC power mains, which supplies a second AC output current, can be connected to the first plug-in charging device by way of a first charging cable in order to supply the battery with charging power as an electric power source in the deactivated state of the electric vehicle. In this case the first plug-in charging device is configured for a load of a maximum electric power voltage of at least 240 volts and a maximum current strength of at least 32 amperes; and a second electric plug-in charging device is integrated into the electric vehicle, and a DC charging station, which supplies a first direct current, can be connected to the second electric plug-in charging device by way of a second charging cable in the deactivated state of the electric vehicle, so that in the deactivated state of the electric vehicle the DC charging station can be used either exclusively or simultaneously with the single phase AC power mains as an electric power source for supplying the battery with charging power.

One advantage of the invention lies in the fact that the vehicle user is offered a degree of flexibility with respect to the options for charging the rechargeable battery in the deactivated state of the electric vehicle. In addition to charging the battery at, for example, a public charging station by use of the DC plug-in charging device, that is, the second plug-in charging device, the charging can be carried out at AC power sources, which are capable of multiple voltages, by use of the AC plug-in device, i.e. the first plug-in charging device.

According to a preferred embodiment of the present invention, the first AC output current is rectified into a second direct current by a first AC/DC converter and a second AC/DC converter that is connected in parallel to the first AC/DC converter. The result of this parallel connection of the two converters is, in particular, a high country specific flexibility with respect to the configuration of the charging function at AC power sources.

According to an additional preferred embodiment of the invention, the second direct current supplies either the electric drive machine with electric power by way of a DC/AC converter that is connected upstream of the electric drive machine; or the second direct current supplies the electric drive machine with electric power by way of the DC/AC converter, which is connected upstream of the electric drive machine, and simultaneously charges the battery.

According to this embodiment, the charging system makes it possible to charge the battery in the ready-to-drive state or in the driving mode with the range extender. This means that the alternating current is generated by the generator that is driven, if necessary (i.e. preferably to extend the range of the trip that has been started or even to enable a planned trip to be started at all), by the internal combustion engine subject to the consumption of fuel. In this case, the power delivered by the generator as the current is diverted preferably in the direction of the electric drive machine from the automotive electrical system, wherein the charging system according to the invention represents a part of this automotive electrical system. As an alternative, the output power is used to some extent to simultaneously charge the battery.

It may also be advantageous that the second AC output current is rectified into a third direct current by the first AC/DC converter and by a second AC/DC converter, which is connected in parallel to the first AC/DC converter; and the third direct current charges the battery.

According to the present description, the major distinction between the third direct current and the second direct current lies, in particular, in the fact that the flow of the second direct current assumes the operation of the range extender; and the flow of the third direct current assumes the charging of the vehicle at an AC power source by way of the first plug-in charging device.

According to an additional embodiment of the present invention, the first AC/DC converter is configured for a maximum input power of at least 230 volts×16 amperes; and the second AC/DC converter is configured for a maximum input power of at least 230 volts×16 amperes.

Such a system enables the user of the electric vehicle, for example, in North America, to connect the electric vehicle to AC power mains, which have different specifications, but are very common, in order to charge the battery. For example, in North America alone, two AC power mains are widespread in the home domain: a secured mains supplying 120 volts at 16 amperes continuous and a secured mains supplying 240 volts at 32 amperes continuous. In the event that the vehicle is brought for charging at the power mains of higher voltage, then the charging of the battery takes place in a shorter period of time (a state that is referred to below in the present document as "fast charging") as compared to the power mains of lower voltage.

In addition, the charging system exhibits preferably the property that the first direct current can be interrupted by a high power switch, in particular, a DC contactor.

Consequently during the charging operation at a DC charging station the battery can be galvanically isolated from the DC charging station, for example, for purposes of high voltage safety.

Furthermore, the charging system according to the invention can be configured in such a way that the second AC/DC converter and the DC contactor are geometrically integrated into a combination charging unit; and that the parallel connection of the first AC/DC converter to the second AC/DC converter is carried out outside the combination charging unit or at the combination charging unit.

This embodiment offers special advantages, in particular, to the vehicle manufacturer, in the sense of a modular design of the automotive electrical system or, rather, the electric vehicle. For example, the described embodiment makes it possible to offer the option of DC charging at a DC charging station in the form of optional equipment, because it is not absolutely mandatory that this function and the components that are technically required for its implementation be present for the functionality of the rest of the charging system. As a result, electric vehicles could be offered in different configurations: that means, only optionally with the possibility of DC charging. In the event that the vehicle is configured with the possibility of DC charging, then an additional configuration example of the charging system could dispense with the second AC/DC converter. Then, a simplified version of the combination charging unit, which is configured without the second AC/DC converter, could be installed outside the factory. This arrangement allows the charging to be carried out at the AC power mains according to the configuration of the first AC/DC converter with only a maximum power of at least 230 volts×16 amperes, i.e. without the possibility of fast charging. If the vehicle is used, for example, predominantly in Europe or in other countries or regions of the world, or is ordered at the vehicle manufacturer from these countries, then the configuration with only an AC/DC converter would be technically adequate in any event due to the absence of a comprehensive distribution of AC power mains with higher output power. In this case, the possibility of fast charging has no technical value for the customer, which means that the customer can be offered a less expensive vehicle without any noticeable technical restriction. The modular design of the charging system according to the invention (referred to below as modularity) allows the vehicle manufacturer to offer, as described above, different versions of the electric vehicle based on the building block principle at a low cost and to consider customer specific requirements, for example, in the form of accessories or country variants, with minimal production effort. In this context, due to this special embodiment of the charging system, the range extender can also be considered to be an option or can be offered as an extra.

Preferably, the combination charging unit, the first AC/DC converter, the first plug-in charging device and the second plug-in charging device are functionally controlled and monitored by at least one control device.

The entire complexity of the software system can be integrated into such a control device or, more particularly, into such control devices to at least such an extent that the modularity of the charging system is not adversely affected. Typically the software tasks comprise control functions, regulating functions, monitoring functions and communication functions via databuses.

A particular embodiment consists of the fact that the first AC/DC converter, the combination charging unit, the AC/DC converter and the control device are components of the electric vehicle.

This special embodiment is associated with, among other things, the advantage that the charging infrastructure can be kept technically as simple as possible outside the vehicle, for example, the DC charging station or the public utility AC power grid; or more specifically establishing a conductive connection via a charging cable has to be enabled, first and foremost, only geometrically.

The invention is based on the considerations presented in the following. The objective is to provide an electric vehicle with a rechargeable battery with different versions of charging devices that differ according to the required charging power of specific countries, for example, charging devices for DC charging, single phase AC charging or three phase AC charging. In addition, the charging infrastructure according to the current state of development of products for mass production is so volatile that it is not foreseeable which charging architectures will actually remain viable in the future. Typically, a single phase 3.5 kilowatt AC charging device matches the state of development of products for mass production with or without the additional possibility of DC charging. One drawback with this technology is that DC charging stations, especially in the USA, are not widespread; and, thus, only the 3.5 kilowatt AC charging device could be used for charging. On the other hand, additional charging variants would have to be developed that in turn do not appear to be necessary for other markets. Therefore, a 3.5 kilowatt AC charging device, which is referred to as the standard charging device in this document, is made available to the driver as the standard equipment. An AC charging device, which is referred to as the comfort charging device in this document, can be ordered as an extra. An additional 3.5 kilowatt AC charging device is built into this comfort charging device and can be connected in parallel to the standard charging device. With such an arrangement it is possible to achieve an AC charging power of 7 kilowatts. If desired, the comfort charging device can be constructed in the same way as the standard charging device. Furthermore, the comfort charging device comprises a device, called the contactor box in this document, for switching high currents; and this device also enables DC charging with high output power. To this end it must be possible to isolate a separate DC charging socket in the vehicle from the high voltage system by way of the contactor box. This arrangement has the advantage that, owing to the connection between contactor box and comfort charging device, there is no need to develop more varieties of the charging architecture, because the described architecture provides charging functions that are flexible across international boundaries. This includes, for example, the AC charging at a 32 amp secured AC power mains in the USA with the additional possibility of DC charging at a DC charging station.

Other objects, advantages and novel features of the present invention will become apparent from the following detailed description of one or more preferred embodiments when considered in conjunction with the accompanying drawings.

BRIEF DESCRIPTION OF THE DRAWINGS

FIG. 1 is a schematic block diagram of a system for charging a rechargeable battery of an electric vehicle according to an embodiment of the invention.

DETAILED DESCRIPTION OF THE DRAWINGS

FIG. 1 shows the automotive electrical system of an electric vehicle with a range extender. The range extender consists of an internal combustion engine 5, which can be configured with a small number of cylinders and can be operated at an operating point that is optimized for fuel consumption and power, and a generator 4, which is mechanically driven by the internal combustion engine 5. The generator 4 generates alternating current 3. The current generation by means of the range extender takes place preferably in the ready-to-drive state in order to extend the range during a trip that has already started or to enable the trip in the first place. In the event that the range extender is in operation, the power generated by the generator 4 is passed to the inputs of two AC/DC converters 14, 15 that are connected in parallel. At their outputs, the resulting direct current 16 is typically used to power the electric machine 2, which converts the electric power into mechanical power. For this purpose a DC/AC converter 17 is connected upstream of the electric machine 2 as the power inverter, because this electric machine cannot be powered with direct current on the input side.

Depending on the possible power output of the range extender 4, 5 and the performance requirement of the electric drive machine 2, the direct current 16 can be made available as an alternative to the charging of the high voltage battery 1, which is constructed preferably in lithium ion technology as an electrochemical energy accumulator system. Other types of electrochemical energy accumulator systems could be, for example, nickel metal hydride batteries or lead acid batteries.

In the deactivated state of the vehicle, that is, when the electric vehicle is not ready to drive, the battery 1 can be charged, according to the topology depicted in FIG. 1, by means of external electric power sources, in this case, for example, the power line from the house to the public AC power grid 8 or a DC charging station 13. Even simultaneous charging at an AC power source 8 and a DC charging station 13 is possible. The charging at an AC power source takes place by attaching a suitable charging cable 9 to the plug-in charging device 6 that is integrated into the vehicle. The alternating current 7 that is made available is rectified by the two AC/DC converters 14, 15; and the resulting direct current 18 charges the battery 1. The two AC/DC converters 14, 15 are configured for a maximum input power of at least 230 volts×16 amperes. The DC charging station 13 is connected to the plug-in charging device 10, which is integrated into the vehicle, by means of a suitable charging cable 11. The direct current 12 that is made available charges the battery 1 and can be interrupted by use of a DC contactor 19, for example, for safety reasons or upon reaching full charge.

The DC contactor 19 and the AC/DC converter 15 are housed preferably in a housing, which is referred to as the combination charging unit 20. The combination charging unit 20 is geometrically configured such that the AC/DC converter 15 can be integrated into the combination charging unit 20 in such a way that it can be mechanically disconnected, for example, with clips, screws or an insert mechanism. This arrangement shows very clearly the modular configuration of the charging system.

As a result, the electric vehicle can be delivered, for example, with or without the DC charging function, i.e. with or without the combination charging unit 20. In the event that the vehicle is equipped with the DC charging function, then the vehicle can still be delivered with or without the fast charging function, i.e. with or without the AC/DC converter 15. Besides, in many countries the AC/DC converter 14 does not reach the power limit, according to the configuration, of at least 230 volts×16 ampere because of the power values of the public utility AC power grid 8, which would be the case, for example, with the 120 AC power main that is widespread in the USA. All those customers can have the cost advantage of being able to dispense with the AC/DC converter 15, a feature that is supported by offering the vehicle with a country specific accessory with or without the AC/DC converter 15.

In this context the configuration of the AC/DC converter 14 for 230 volts×16 amperes does not constitute a functional advantage, but rather a cost disadvantage for many countries. Even the range extender, i.e. the combination of generator 4 and internal combustion engine 5 can also be offered as an option independently of the above described variants. In the event that the generator 4 and the internal combustion engine 5 are not installed in the vehicle, there is no need for alternating current 3. The charging system is regulated, controlled and monitored by a control device 21 independently of the chosen variant. The communications paths that are necessary for this purpose and that are implemented via databuses, are shown as dotted lines in FIG. 1.

LIST OF REFERENCE NUMERALS 1 rechargeable battery
2 electric drive machine 3 first AC output current
4 generator
5 internal combustion engine
6 first plug-in charging device
7 second AC output current
8 AC power mains
9 first charging cable
10 second plug-in charging device
11 second charging cable
12 first direct current
13 DC charging station
14 first AC/DC converter
15 second AC/DC converter
16 second direct current
17 AC/DC converter
18 third direct current
19 DC contactor
20 combination charging unit
21 control device The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A system for charging a rechargeable battery of an electric vehicle, the system comprising:
   an electric machine configured to convert electrical power into mechanical power for driving the electric vehicle;
   a generator configured to generate a first AC output current;
   an internal combustion engine configured to drive the generator to generate the first AC output current and being startable during a driving mode of the electric vehicle; and
   a first electric plug-in charging device,
   wherein the generator is configured to, at least temporarily, be an electric power source for supplying the rechargeable battery with charging power after the internal combustion engine is started,
   wherein the first plug-in charging device is geometrically configured to be connectable, via a first charging cable, with single phase AC power mains supplying a second AC output current, in order to supply the rechargeable battery with charging power as an electric power source in a deactivated state of the electric vehicle,
   wherein the first plug-in charging device is operatively configured for a maximum electric power voltage load of at least 240 volts and a maximum current strength of at least 32 amperes,
   wherein a second electric plug-in charging device is integrated into the electric vehicle and is connectable, via a second charging cable, to a DC charging station that supplies a first direct current, in the deactivated state of the electric vehicle so that in the deactivated state the DC charging station is usable as selected between one of: exclusively and simultaneously with the single phase AC power mains, as an electric power source for supplying the rechargeable battery with charging power,
   wherein a high power switch operatively configured to interrupt the first direct current,
   wherein the first AC output current is rectified into a second direct current via a first AC/DC converter and a second AC/DC converter, the first and second AC/DC converters being coupled in parallel, and
   wherein the second AC/DC converter and the high power switch are geometrically integrated into a modularly-configured combination charging unit.

2. The system according to claim 1, wherein the second direct current supplies the electric machine with electric power via a DC/AC converter coupled upstream of the electric machine or supplies the electric machine and simultaneously charges the rechargeable battery.

3. The system according to claim 1,
   wherein the second AC output current is rectified into a third direct current by the first AC/DC converter and the second AC/DC converter; and
   wherein the third direct current charges the rechargeable battery.

4. The system according to claim 1,
   wherein the first AC/DC converter is operatively configured for a maximum input power of at least 230 volts×16 amperes; and
   wherein the second AC/DC converter is operatively configured for a maximum input power of at least 230 volts×16 amperes.

5. The system according to claim 1, wherein the high power switch is a DC contactor.

6. The system according to claim 5,
   wherein the second AC/DC converter and the DC contactor are geometrically integrated into a combination charging unit; and
   wherein the parallel coupling of the first and second AC/DC converters occurs either outside of the combination charging unit or at the combination charging unit.

7. The system according to claim 5, wherein the combination charging unit, the first AC/DC converter, the first plug-in charging device and the second plug-in charging device are functionally controlled via at least one control device.

8. The system according to claim 6, wherein the first AC/DC converter, the combination charging unit, the second AC/DC converter and the at least one control device are components of the electric vehicle.

9. An electric vehicle, comprising:
   a rechargeable battery;
   an electric machine;
   a generator operatively configured to generate a first AC output current;
   an internal combustion engine operatively configured to drive the generator to generate the first AC output current and being startable during a driving mode of the electric vehicle;
   a first electric plug-in charging device; and
   a second electric plug-in charging device,
   wherein the first plug-in charging device is geometrically configured to be connectable via a first charging cable with single phase AC power mains supplying a second AC output current in order to supply the rechargeable battery with charge power in a deactivated state of the electric vehicle,
   wherein the first plug-in charging device is operatively configured for a maximum electric power voltage load of 240 volts and a maximum current strength of 32 amperes,
   wherein the generator is usable, when the internal combustion engine is started, for supplying the rechargeable battery with charge power, wherein the second electric plug-in charging device is operatively configured to be connectable, via a second charging cable, to a DC charging station supplying a first direct current in the deactivated state of the electric vehicle, whereby the DC charging station is usable as selected between one of: exclusively and simultaneously with the single phase AC power mains, to supply the rechargeable battery with charge power, wherein a high power switch operatively configured to interrupt the first direct current, wherein a first AC/DC converter and a second AC/DC converter connected in parallel, wherein the first and second AC/DC converters are operatively configured to rectify the first AC output current into a second direct current, and wherein the second AC/DC converter and the high power switch are geometrically integrated into a modularly-configured combination charging unit, while the first AC/DC converter is disposed externally from the modularly-configured combination charging unit.

10. The electric vehicle according to claim 9, further comprising:

a DC/AC converter coupled upstream of the electric machine, the second direct current being supplied to the electric machine via the DC/AC converter or being supplied to the electric machine and simultaneously to the rechargeable battery for charging.

11. The electric vehicle according to claim 9, wherein the first and second AC/DC converters are operatively configured to rectify the second AC output current into a third direct current, the third direct current being supplied to charge the rechargeable battery.

12. The electric vehicle according to claim 9, wherein the first and second AC/DC converters are, respectively, configured for a maximum input power of at least 230 volts×16 amperes.

13. The electric vehicle according to claim 9, wherein the high power switch is a DC contactor.

14. The electric vehicle according to claim 13, further comprising at least one control device operatively configured to control the combination charging unit, the first AC/DC converter, the first plug-in charging device and the second plug-in charging device.

15. The electric vehicle according to claim 9, wherein the parallel coupling of the first and second AC/DC converters occurs outside of the combination charging unit.

16. The system according to claim 1, wherein the combination charging unit, comprising the second AC/DC converter and the high power switch, is disposed in a housing that is removeably distinct from the vehicle.

17. The electric vehicle according to claim 9, wherein the combination charging unit, comprising the second AC/DC converter and the high power switch, is disposed in a housing that is removeably distinct from the vehicle.

18. The system according to claim 16, the second AC/DC converter is integrated into the combination charging unit so as to be mechanically disconnectable therefrom, and removable from the housing.

19. The system electric vehicle to claim 17, the second AC/DC converter is integrated into the combination charging unit so as to be mechanically disconnectable therefrom, and removable from the housing.

* * * * *